United States Patent Office 3,843,462
Patented Oct. 22, 1974

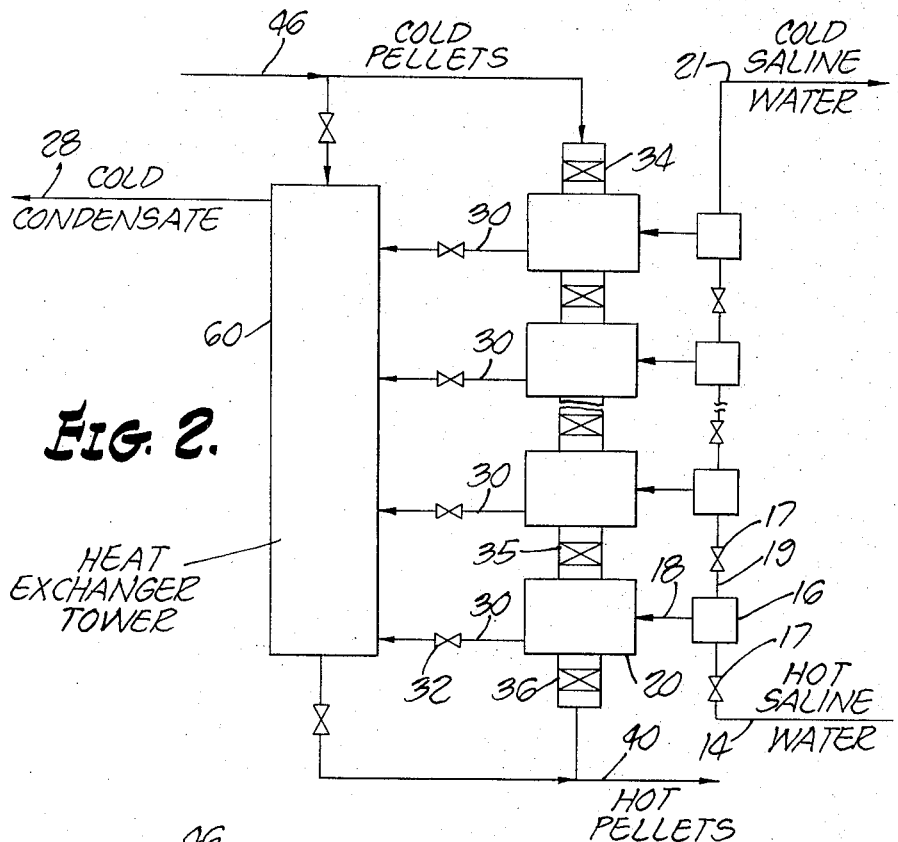
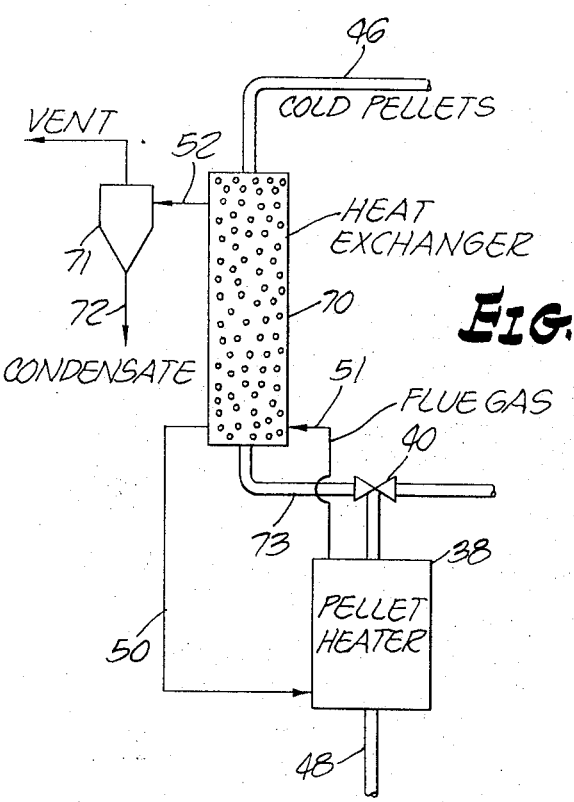

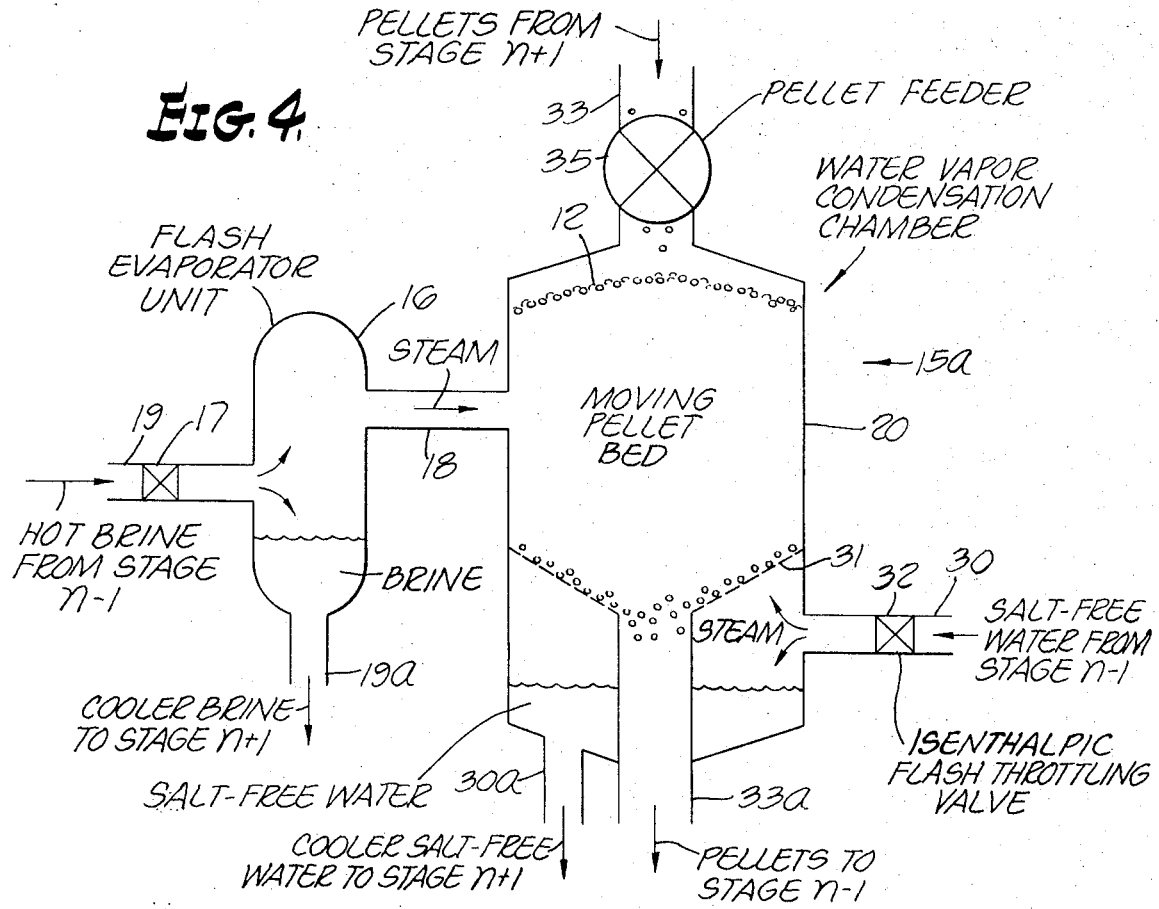
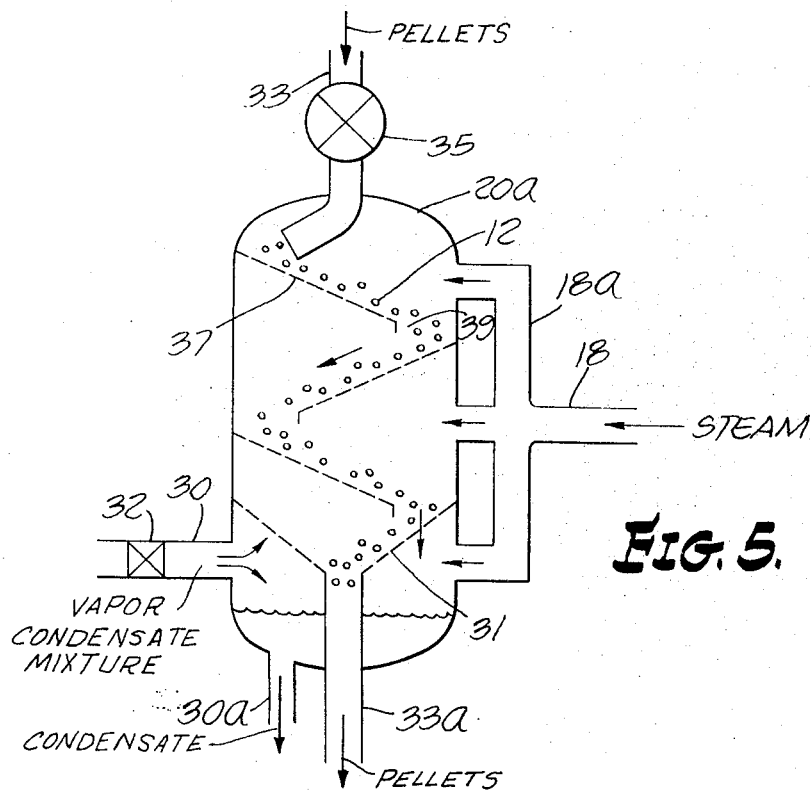

3,843,462
HOT BALL DESALINATION PROCESS
John R. Phillips, Claremont, Calif., assignor to Occidental Petroleum Corporation, Los Angeles, Calif.
Continuation-in-part of application Ser. No. 58,471, July 27, 1970. This application Nov. 22, 1972, Ser. No. 308,773
Int. Cl. B01d 1/26, 3/02, 3/00
U.S. Cl. 203—11
14 Claims

ABSTRACT OF THE DISCLOSURE

A process and apparatus for the desalination of seawater and other brackish waters wherein heated pellets are added countercurrently to a moving stream of seawater to heat the brine, the water and pellets are separated, water vapor is flash distilled from the brine and the vapor is condensed on the surface of the pellets which have been cooled by their initial passage through the brine stream, the water condensate is removed from the pellets and the pellets are reheated so they can be recycled through the brine solution.

---

This is a continuation-in-part of my pending application Ser. No. 58,471, filed July 27, 1970, now abandoned on hot ball desalination.

BACKGROUND OF THE INVENTION

The problem of extracting water from seawater and other brackish waters so that these waters can be used for providing drinking and/or irrigation water is under intensive research throughout the world. Methods which have received considerable attention include: reverse osmosis, freezing, extraction, electrodialysis, and distillation.

Distillation processes appear to be the best method yet developed for large scale desalination. Currently, much research is being done on multi-stage flash distillation processing wherein saline water is heated and thereafter salt free water is flash distilled from the water in a series of stages along a descending thermal gradient.

To date, flash distillation processes have been restricted to relatively low maximum operating temperatures owing to scale formation on conventional heat transfer surfaces. The result has been that operating costs (primarily the cost of energy required for the process) and equipment costs have been reasonably well optimized so that decreasing one increases the other, and vice versa, resulting in an overall increase in costs. Thus, a significant reduction in the cost of desalted water is dependent on a major change from current practice, such as operating at higher maximum temperature, or using radically different heat transfer methods.

U.S. Pat. No. 3,390,078 entitled "Improved Saline Water Heating Process" issued on June 25, 1968 to Loranus P. Hatch provides a method of heating saline solutions; such as seawater which contain salts having inverted solubility in water with respect to temperature; to extremely high temperature without causing undesirable salt scaling on the heat transfer surface. The scaling in this process is eliminated by heating the seawater in a heat exchanger wherein the walls of the exchanger vessel are utilized as a heat transfer surface and a fluidized bed of particulate solids is maintained in the heat exchange vessel in contact with the heated walls. In that process the seawater is utilized as the fluidizing medium. When that process is employed, the salts having inverted solubility curves crystallize in the solution and not on the walls of the exchanger.

U.S. Pat. No. 3,242,975 entitled "Process and Apparatus for Effecting Heat Transfer" issued on Mar. 29, 1966 to A. Kogan proposes the use of heated metal particles to be dropped downwardly countercurrently through an upwardly moving stream of saline water to preheat the saline water; thereafter according to the disclosure of that patent, the particles are separated from the saline solution and washed to remove any residual salts therefrom, the preheated saline solution is then heated in a conventional heat exchanger and potable water is flash distilled therefrom and the washed metal particles are then passed through a stream of warm converted water recovered from the evaporation unit to preheat them for recycling through the system saline water preheating apparatus and the distillate is then collected.

The Hatch process and the Kogan process represent distinct advances in the art. The Hatch process has a liquid/solid heat exchange surface area limited to the surface area of the heat exchanger vessel walls. The Kogan process requires a double heating of the brine, first it preheats it with the heated pebbles, thereafter it further heats the brine in a conventional heat exchanger and in the latter heating it is bound by the temperature limitations of the prior art due to scaling problems, from salts having inverted solubility curves.

It is an object of this invention to provide a desalination process and apparatus capable of providing a vastly increased solid surface area to effectuate solid/liquid and solid/vapor heat exchange for both brine heating and water vapor condensation in the desalination of seawater and other brackish waters and which has the further advantage of limiting detrimental effects arising from scaling of the solid heat exchange surface due to the brine containing salts having inverted solubility curves in the water with respect to temperature. These and other objects will become apparent from the discussion which follows:

SUMMARY OF THE INVENTION

This invention discloses a process for recovering potable water from saline solutions such as seawater and other brackish waters in a pressured multistage flash distillation system comprising pressurizing the saline water to a pressure that will ensure that the saline water will remain liquid during heating of the water, heating an upwardly flowing stream of the pressurized saline water by countercurrently flowing heated pellets through said stream of saline water, separating said pellets from the stream of saline water; flash distilling water vapor from said heated water; condensing the water vapor produced by distillation on the surface of the separated pellets, removing and collecting the desalinated condensate from the surface of the pellets; reheating the pellets for recycling through the system. It further discloses a multistage flash distillation apparatus for recovering potable water from saline waters comprising saline water; water pressurizing means for compressing the water to a pressure that will ensure that the water will be liquid during heating of the water operably connected to the system; an enclosed vessel in which saline water is to be heated, said vessel having water inlet and water outlet means operably connected and positioned to permit an upwardly flowing stream of saline water to pass through the vessel; solid heatable pellets which are insoluble in the saline solution; means for delivering a stream of the heated pellets operably connected to the upper portion of the vessel without substantially lowering the water pressure in the vessel so that the heated pellets flow countercurrently downwardly through the saline water in the vessel to enable the pellets to transfer a portion of their heat to the saline water flowing upwardly in the vessel; means for removing the cooled pellets operably connected to the vessel after they have heated the saline water; means for distillation of water vapor from the heated saline water operably connected to the vessel saline water outlet means;

means for contacting the water vapor from the distillation means with the cooled pellets that have been removed from the vessel in order to permit condensation of the vapor on the surface of the pellets; means for removing and collecting the condensate from the surface of the pellets; means for transporting the pellets which have had the condensate removed therefrom, to a pellet heating means for recycling through the apparatus.

BRIEF DESCRIPTION OF THE DRAWING

FIG. 2 is a schematic drawing showing an alternative water vapor condensation system in accordance with the practice of this invention.

FIG. 3 is a schematic drawing of an additional unit for increased utilization of heat from flue gases in accordance with the practice of this invention.

FIG. 4 is a schematic drawing of a flash evaporative stage for use in accordance with the practice of this invention.

FIG. 5 is a schematic drawing of an alternative water vapor condensation chamber used in accordance with the practice of this invention.

DETAILED DESCRIPTION OF THE INVENTION

Figure 1:
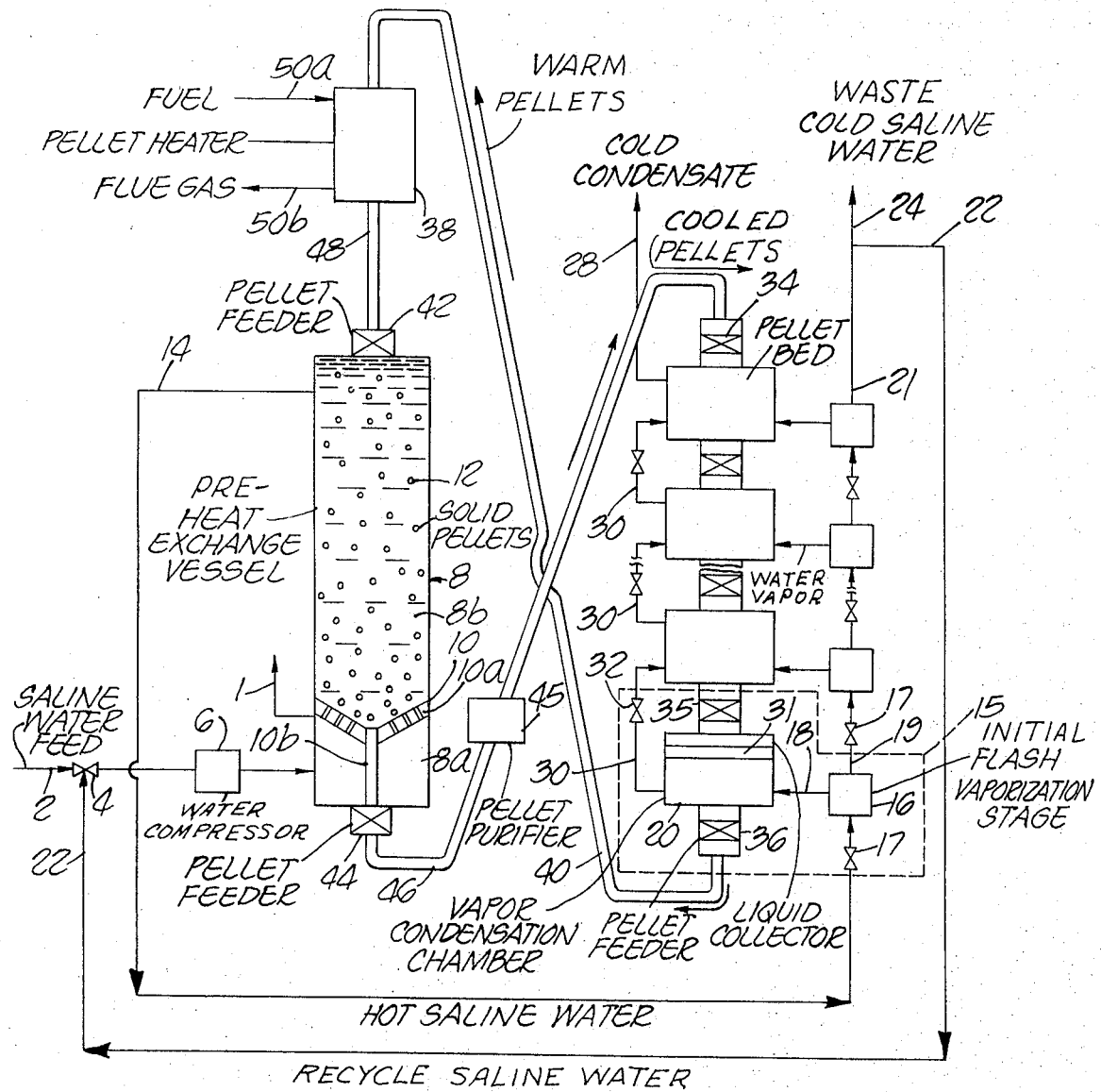
FIG. 1 is a schematic drawing showing an apparatus designed in accordance with the teaching of this invention.

In a preferred embodiment of this invention potable water is recovered from saline solutions such as seawater and other brackish waters in a pressurized multistage flash distillation system by means of pressurizing the saline water to a pressure that will ensure that the saline water will remain liquid during the heating of the water; heating an upwardly flowing stream of the pressurized saline water by countercurrently flowing heated pellets through said stream of saline water; separating said pellets from the stream of heated saline water; flash distilling water vapor from said heated water in a series of independent flash distillation stages along a descending thermal gradient, while sequentially contacting the water vapor in each of the flash distillation stages with a moving stream of pellets, which pellets have been separated from the saline waters, along an ascending thermal gradient to condense the water vapor on the pellets; removing and collecting the desalinated condensate from the pellets; reheating the pellets for recycling the pellets through the system.

It is to be understood that this invention discloses a process for the desalination of saline water such as seawater and other brackish waters and that the process can be utilized to produce both potable water as well as for the mere upgrading of such saline waters for use as farm irrigation water wherein the degree of desalination is less than that required for potability. Essentially this invention consists in utilizing pellets as heat exchange units for both heating of the brine solution and as a relatively cool condensation surface to condense the water vapor distilled from the heated brine. The pellets go through a three phase thermal cycle to effectuate the thermal effect required by the system as follows:

a. Brine heating phase—hot pellets having sufficient heat to heat the brine to the desired temperature, when introduced into the brine, are reduced in temperature by giving up a portion of their heat to the brine and after flowing through the brine they have a temperature just about equal to the temperature of the brine flowing into the heat exchange phase.

b. Water vapor condensation phase—the pellets after passing through the brine heating phase which have a temperature approaching that of the saline water raw material being fed into the process are contacted with water vapor which is evaporated out of the heated brine and adsorb the heat of the vapor and have the water vapor condense on their surface which causes the temperature of the pellets to rise during this part of the cycle, thus providing a significant economic advantage to the process.

c. Pellet heating phase—after having the condensate removed from the surface of the pellets, the pellets are then heated to a temperature sufficient to heat the brine to the desired temperature for recycling through the brine heating phase.

The pellets found useable in this invention must have a specific gravity sufficiently high to allow them to flow downwardly countercurrently through the brine which is to be desalinated. Thus, they must have a specific gravity greater than the brine solution and the specific gravity differential should be great enough to allow reasonable pellet throughput to enable the brine to be heated at the desired flowrate. Pellet selection will of course be dependent upon both the desired process economics and efficiencies that the designer desires.

The present invention employs an initial solid/liquid heat exchange vessel to heat the entering brine by passage of solid pellets through the liquid brine. The solid pellets can be made of any suitable material such as iron, aluminum, stainless steel and mixtures thereof. In the flash stages, the salt free vapor is condensed directly on the surface of the solid particles and then can be collected and transported with the pressure gradient through any remaining flash stages. This process both eliminates the requirement for elaborate stage internals and reduces the number of times that heat must be transferred. The heated solids are then further heated by direct contact with steam or gases from a fired heater in order to make the process operable. Alternately, the condensate from each stage may be passed countercurrently against a flow of cool pellets.

These and other features of the present invention will become apparent by referring to the FIG. 1 and the following detailed description of the present invention. In the figure, brine flow is indicated by a solid line, desalted water flow by a solid line, and solids flow by a double solid line.

Cold brine enters the process at saline water feeder line 2 and the cold brine then may selectively be combined with recirculated brine from brine line 22 at junction valve 4 which valve 4 allows for heated and flashed brine, which has been previously cycled through the system, to be intermixed with the fresh saline water being fed through the system, if desired, for a higher fresh water production per unit of feed brine. The cold brine stream is then compressed in a liquid compressor device 6, to a pressure that will insure that the brine will remain liquid upon reaching its maximum temperature in heat exchange vessel 8.

The cold brine that enters the heat exchange vessel 8 and after passing through a suitable flow distribution device 10 located in the lower portion of vessel 8, is heated in countercurrent fashion by hot solid pellets 12 which are passing down through the brine under the force of gravity. The flow distribution device 10 is typically a conical perforated plate or screen 10a having an opening in the center which opens into pipe 10b. Cold brine passes from chamber 8a into chamber 8b of vessel 8 through the openings in plate or screen 10a. The pellets 12 cannot pass through plate 10a and are directed by the incline walls of the plate to the opening wherein they pass into pipe 10b. Heated brine is then withdrawn from heat exchange vessel 8 at the top of the vessel 8 through hot water line 14 which is operatively connected to the top of vessel 8 to remove water from the vessel 8. Maximum brine temperatures as water leaves vessel 8 may vary over a wide range, anywhere from about 200° F. to above the critical temperature, of the saline solution. The hot brine is carried by hot water line 14 to the first of a series of flash evaporation stages 15. Each stage 15 consisting of a flash evaporator unit 16 and a vapor condensation chamber 20. In unit 16, the pressure of the brine stream is reduced by a suitable flash vaporization device 17, such as an isenthalpic flash throttling valve, in such manner that the brine stream is partially vaporized. The decrease in pressure is accompanied by a decrease in temperature of the vapor-liquid mixture. The water vapor, which is suitably salt free with or without entrainment separation, is carried by water vapor conduit 18 to the water vapor condensation chamber 20, where the vapor is condensed by contact with a moving bed of relatively cool solid pellets 12.

Brine from the first stage 15 next enters a second flash stage 15, which is maintained at a lower pressure than the first stage, through brine line 19 and the process described above is repeated. After passing through a series of such flash stages 15, the brine emerges from the last stage 15 through brine line 21 at a relatively cool temperature. The brine is then disposed of as waste brine, through brine line 24, or partially recirculated back to the entering saline water stream at junction 4 through brine line 22, depending upon the salt concentration in the brine, the temperature of the brine, and actual requirements of the working system.

The salt-free vapor in the first flash evaporator stage 15 is contacted by a moving bed of relatively cool solid pellets 12 in a manner such that heat transfer is achieved. As a result, the vapor is condensed on the surface of the pellets 12. The condensed salt-free liquid or condensate is then separated from the solid pellets, by liquid collecting means 31, using some device such as screen, air knife, etc. The condensate then leaves the condensing region of the first flash stage, and goes to a separate countercurrent pellet heat exchanger, or after passing through a suitable pressure reducing device 32, such as an isenthalpic flash throttling valve, enters the condensing region of the second flash stage 15 via water line 30, which, as previously indicated, is at a lower pressure and temperature than the first stage. Part of the condensate is vaporized in the pressure reducing device 32 prior to entering the second stage. In the second stage, the salt-free liquid or condensate is kept separate from the brine stream. The two vapor streams are condensed by contact with relatively cool solid pellets of the second stage. This procedure is repeated in subsequent stages until a relatively cool product water stream emerges from the final stage through water line 28. Note that the number of such flash stages is variable and will depend on economic considerations regarding equipment costs and heat requirements. As shown above, salt-free water or condensate is removed from the condensing region of the first flasher stage 15 to the next flash stage through water line 30, which has the flasher device 32 which also prevents backflow into the first stage and acts as a pressure reducer.

The relatively cool solid pellets 12 after having heated the brine in vessel 8 enter the flash stages through solids feeder device 34. The pellets are then heated, by condensing the water vapors, to a temperature approaching that of the condensing vapor. The hot pellets 12 leave the last flash stage 15 through a solid feeder device 36. Solid feeder devices 35 feed the pellets 12 between the various stages 15.

The hot solid pellets 12 are then transported by pebble transfer conduit 40 to a heat exchanger 38 where they are heated by countercurrent contact with hot gases transported by hot gas line 50a from a fired heater (not shown). The exhaust gases are vented from the exchanger 38 through a line 50b. The pellets 12 leave exchanger 38 at a temperature sufficiently high to insure that exchanger 8 will be operable and pass into heat exchange vessel 8 through a solids feeder device 42.

The hot solid pellets 12 then enter the top of exchanger vessel 8. After passing through a suitable solids feeder device 42, the pellets pass through the brine or saline water in exchange vessel 8 in direct countercurrent contact with the entering, relatively cool, saline water. By this process the pellets 12 are cooled, and the saline water is heated. The overall saline water and pellets 12 flow rates, and pellet heat transfer properties are selected to maintain minimum temperature differentials between the pellets and saline water at each end of heat exchange vessel 8, to maximize the thermal efficiency of the system. The cooled pellets 12 drop to the bottom of vessel 8, pass through the pipe 10b and leave the heat exchanger 8 through a solids feeder device 44 and are transported by a pebble transport conduit 46 to the solids feeder device 34. After leaving the heat exchange vessel 8, the solids can, if required, be washed in a suitable pellet purification means 45. Washing in some applications of this invention is required to eliminate contamination of the product water by brine carried with the solids into the flash chamber 16, and may be accomplished by bathing, spraying or washing the pellets 12 with air and/or water in the pellet washer 45.

The relatively brine free and cool pellets 12 are thus carried by pellet transport means 46, to the last (lowest temperature) of the series of water vapor condensation chambers 20 where they are contacted in countercurrent fashion by relatively hot salt-free vapors. As previously described, the pellets 12 are thus heated by the condensing vapors. The pellets 12 then flow through solids feeder devices and pebble transport conduits (often by gravity) into the next higher temperature flash stage 15 and the process is repeated. Finally, the solids exit from the first flash (or highest temperature) stage 15 and are carried to pellet heater 38 be means of pellet transport 40. The relatively hot pellets 12 are then carried by pellet transport means 48 to heat exchanger vessel 8 for recycling through the system.

The solids feeder devices utilized in this invention must be capable of passing the pellets through the pressure differentials inherent in the system without significantly changing the pressure differentials by their passage. For example, as the pellets come down from the heat exchanger 38 through pellet transport conduit means 48 they are under a pressure which is less than that found in heat exchanger vessel 8 into which they must be passed. They must be passed into vessel 8 without causing a significant pressure drop in the vessel 8. This can be readily accomplished by conventional positive solids feeder devices designed for such purposes such as segmented screw type deviecs or rotary star shaped feeders which will urge a continuous stream of portions of pellets forward through the pressure differential in the system without permitting significant portions of the pressurized media to cross the barrier created by the solids feeder devices. Such type solids feeder devices will of course be empolyed whenever the pellets must be transported across a pressure differential throughout the system to maintain the required pressure differentials. They of course can be advantageously utilized to provide the necessary power for pellet transport throughout the system. However, separate and/or auxiliary power for pebble transport can be utilized in this invention if the need arises without affecting the basic nature of the invention.

Typical pellet feeder devices are disclosed in the following patents: 2,886,191; 2,879,094; 3,201,007 and 3,052,538. Commercially available feeder devices which can be utilized in the present invention include the Beaumont Birch Company's STT Mark II Sealed Rotary Feeder for Solid Feed. These rotary feeders are ideal for iron or other solid pellets and operate under high differential pressures. Where needed, two or more rotary feeders can be placed in a series to lessen the pressure differential between the two sides of the feeder.

The flow distribution system 10 can be any of the conventional flow distribution systems conventionally employed. Its function is to produce the desired current flow of water up through vessel 8 while the pellets 12 are heating the saline water. It can be as simple as a porous or finely channelled cone shaped plate which can produce swirling of the water or even flow with its shape being employed to collect the pellets 12 for solids feeder device 44.

In operations wherein saline waters are to be heated above 243° F. the flow distribution system should be designed to provide for as much dynamic agitation of the pellets as is practical from an economic and efficiency standpoint to prevent scale from forming on the pellets 12 and the vessel 8 walls and to cause the salts having invert solubility curves with respect to the solvent (water) to crystallize out directly within the brine. In the latter case auxiliary vibration or liquid turbulent current generating means can be employed to insure that the salts having invert solubility in the water with respect to temperature will crystallize within the water and not form scale on the pellets and vessel wall. Such auxiliary turbulent current generating means will not be needed if pellets of proper density and design are used with fluid flow rates which will maintain the pellets in dynamically agitated state such that an expanded or substantially fluidized bed state is achieved by the passage of the pellets downward through the saline water during some or all of the heating stage of this invention. The turbulent currents found useable in brine heating stage of this invention can readily be produced by conventional turbulent current generation means i.e., creating ultrasonic effects on the particles, a turbulent vibrational fluid flow produced by the incorporation of a pulsed diaphragm in the brine heating portion of the system.

In the preferred embodiment of this invention sufficient dynamic agitation should be provided to cause the invert salts having invert solubility to crystallize out directly in the solution and not on the pellets and/or the walls of the vessels and/or conduits. When such is the case means should be provided to remove the crystal from the heated aqueous portion. The exact point at which the crystals form will of course be dependent on the design parameters of the system and in some designs means for permitting crystal growth such as a seed growing tank can be provided after the brine leaves the tank and is separated from the pellets. In other designs wherein the residence time of the brine in vessel 8 is such that crystallization formation takes place in the brine, then the three components are separated from each other by conventional separation means. See U.S. Pat. No. 3,390,078.

In the event that the brine heating system chosen does not provide sufficient dynamic agitation to cause crystallization of the salts having invert solubility curves with respect to the solvent and scaling occurs on the surfaces of the pellets and/or the vessel walls then the pellets must be descaled upon leaving the brine heating stage by conventional descaling means such as water/steam wash, mechanical scrubbing, vibration and the like and conventional means of descaling the vessel may be employed such as rotating scrubbers.

Of course other conventional methods of prevention of scale can be suitably employed in the practice of this invention such as chemical pretreatment of the brine which will inhibit scaling i.e., addition of acids, etc. to the brine prior to heating it to temperatures in which scaling becomes a problem.

The pressurzation of the liquid during its heating must be sufficient to prevent premature vaporization of the liquid and apparatus for achieving the required degree of pressurization of the system is well known to those skilled in the art.

In the apparatus shown in the FIG. 1, pellet purification means 45 is provided in the event that solids feeder device 44 permits the pellets to emerge from vessel 8 with excess brine adhering thereto which would contaminate desalinated water which is to be collected on the pellets later in the cycle. Minute amounts of brine are not a hinderance to potability. Such pellet purification means 45 can be any conventional device which would remove any excess brine and/or salts from the surface of the pellets such as blowing them off the pellets with an air blow, washing pellets in pure water, contacting the pellets with a liquid absorbent, etc.

The temperature to which the saline waters are to be heated range from about 200° F. to above the critical temperature of the saline solution. By the term, critical temperature, as used in this invention is meant the temperature above which the liquid and vapor phase are no longer distinguishable. That is to say, that above this temperature the vapor cannot be liquified at any pressure. In general, the process is most suitable for operating as a multistage flash distillation process when the saline water is heated to a temperature ranging from about 400° F. to 450° F.

As shown in FIG. 2, an alternative means of cooling the condensate, 30, from each flash vaporization stage 20 is by means of a separate heat exchange tower 60. Cold pellets 45 enter countercurrent to the stream of condensate, formed from each evaporator stage and after being heated join the main hot pellet stream 40. As a further means of cooling the pellets as far as possible before sending them to the condensing service, additional feed brine can be used in the final contacting section of the pellet heat exchanger vessel 8, and then bled from the system without going to desalination, if desired, alternately a separate final cooling section could be employed using a cooling tower or refrigerant system for the final cooling if such cooling is desirable.

As shown in FIG. 3, heat from the exit flue gas, 51, from the pellet heater, 38, or any other source, can also be used to heat pellets and produce condensate or distilled water. The flue gas passes countercurrent to pellets in a heat exchanger, 70, and leaves through a cold gas line 52. Condensate 72 can be removed either from the exchanger body, 70, or in a preferred embodiment as entrainment from the cold exit flue gas which is treated in an appropriate entrainment separator, 71. The heated pellets are removed from the exchanger body 70 by pellet transport means 73 to join the main pellet stream, 40, or to be treated separately.

Referring to FIG. 4, a flash evaporation stage 15a is illustrated. The stage 15a consists of a flash evaporator unit 16 and a water vapor condensation chamber 20. For purposes of this description this stage 15a will be considered the $n$ stage. The adjacent up-stream high temperature and high pressure stage will be considered $n-1$ and the adjacent low temperature and low pressure stage will be considered $n+1$ stage. Hot brine from the $n-1$ stage (not shown) is transported to the $n$ stage via brine line 19 and the isenthalpic flash throttling valve 17. A portion of the hot brine is vaporized passing through the valve 17 to form steam. The steam passes from unit 16 via steam line 18 into the condensation chamber 20. The non-vaporized brine in unit 16, which is slightly cooler than the hot brine passing through valve 17, is passed to the next down stream flash evaporator unit stage $n+1$ (not shown) through an isenthalpic flash throttling valve (not shown) via brine line 19a. Salt-free water from stage $n-1$ is passed through water line 30, through the isenthalpic flash throttling valve 32, wherein a portion of the salt-free water is vaporized to steam and the remaining water is slightly cooled into a condensation chamber 20. Relatively cool pellets 12 from stage $n+1$ flow through conduit 33 in the pellet heater 35. The pellets 12 are fed into the condensation chamber 20 by a pellet feeder 35 at a rate to insure that the condensation chamber 20 always contains pellets 12. The steam entering from lines 18 and 30 comes in contact with the relatively cool pellets 12 and condensed transferring heat energy to the pellets. The pellets pass through a conduit 33a to the water vapor condensation chamber of stage n−1 via a pellet feeder (not shown). The condensed salt-free water drips off the pellets, proceeds through the bed of pellets, and drops through the openings in the conical apertured or screen plate 31 and drops to the reservoir at the bottom of condensation chamber 20. The salt-free water is passed from condensation chamber 20 to the down stream stage n+1 via an isenthalpic flash throttling valve (not shown).

FIG. 5 illustrates another embodiment of a water vapor condensation chamber 20a which is a part of this invention. Condensation chamber 20 has many elements identical to condensation chamber 20a and these elements are identical by the same numerals. The steam conduit 18 feeds into a manifold 18a which has a plurality of inlet pipes entering the condensation chamber 20a. Within chamber 20a and above the conical apertured or screen plate 31 there are a plurality of inclined apertured screens or plates 37. Each plate 37 obturates a substantial portion of the condensation chamber 20a. On one side of each plate 37 there is an opening 39 between the edge of plate and the wall of chamber 20a. This opening is positioned at the bottom of the incline of each plate and the plates are arranged so that the opening of each successive plate is at the opposite side of the chamber as the opening of the preceding plate. Thus, in the condensation chamber when the pellets are fed from the feeder 35 they fall onto the top plate 37 and roll or slide down the inclined plate to the opening at the base of the incline; wherein the pellets fall onto the next plate 37 and roll or slide down it in the opposite direction to the opening at the bottom of its incline and so on for plate 37. The pellets 12 drop from the opening 39 of the last plate on to the plate 31. Chamber 20a can be constructed with as many plates 37 as is economically or practically feasible. The steam from lines 18 and 30 enter the chamber 20a and pass up through the openings of the plate 31 and the openings of the apertured screen or plates 37. The steam comes in contact with a relatively cool pellet condenses thereon, and transfers its heat to the pellets. The condensed salt-free water drops to the bottom of chamber 20a and is passed via pipe 30a to the next succeeding donw stream stage which has a lower temperature and lower pressure. The condensation chamber 20a can be utilized in place of condensation chamber 20 described in FIG. 3.

Figure 6:
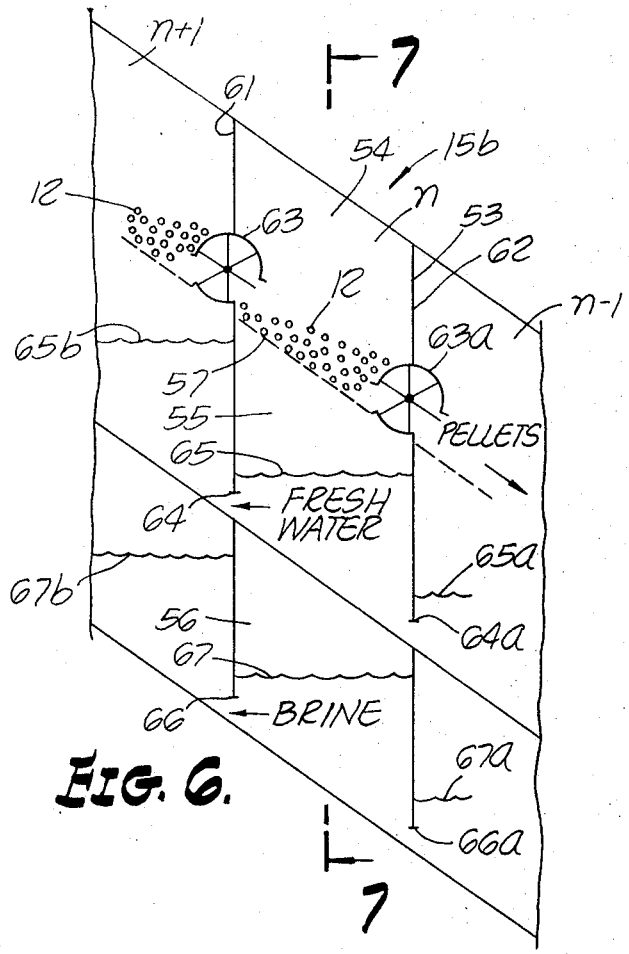
FIG. 6 is a schematic drawing of an alternative flash evaporative unit used in accordance with the teaching of the invention.

In FIG. 6 another embodiment of the present invention is illustrated. A flash evaporation stage 15b is illustrated in FIG. 6. The stage 15b is adjacent to two other flash evaporative stages of like design. In this embodiment of the invention, it is contemplated that there will be a plurality of stages 15b combined in one inclined unit. The stage 15b has one chamber 53 (this is better illustrated in FIG. 7) which is divided into three zones: pellet zone 54, fresh water zone 55, and the brine zone 56. A perforated plate 57 separates the pellet zone 54 from the fresh water zone 55. Situated within the fresh water zone 55 there is a U shaped trough 59 having an open top facing the bottom of the perforated plate 57. The bottom of trough 58 separates the fresh water zone 55 from the brine zone 56.

With reference to FIG. 6, the flash evaporative stage to the right of stage 15b, the n stage, is the up-stream high temperature, high pressure stage. The flash evaporative stage to the left of stage 15b is the down-stream low temperature, low pressure stage. The stage to the right of the n stage will be considered the n−1 stage and the stage to the left of the n stage will be considered the n+1 stage. The chamber of the n+1 stage is separated from the chamber 53 of the n stage by wall 61; and the chamber of the n−1 stage is separated from the chamber 53 of n stage by wall 62. A pellet feeder 63 for the pellets is situated in wall 61 level with the perforated plate 57 and a similar pellet feeder 63a is situated in wall 62 in the plate of the perforated plate 57. In the area of the wall 61 which is intersected by the walls of the trough 59 near the bottom of the trough there is an opening 64 which is below a liquid level 65 of the salt-free water in trough 59. A similar opening is found in wall 62 which is also below a liquid level 65a of the salt-free water in the trough in stage n+1. There is another opening in wall 61 at the base of chamber 54 in the brine zone 56 which interconnects stage n and n+1 and which is below a liquid level 67 of the brine in the brine zone. Similarly there is an opening 66a in wall 62 connecting stage n with stage n−1 in the brine zone 56 located at the bottom of chamber 54 and below a liquid level 67a of the brine in the brine zone of stage n−1.

Figure 7:
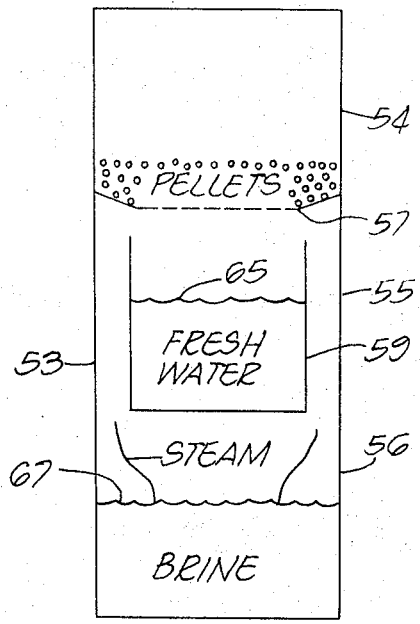
FIG. 7 is a cross-section view of the alternative flash evaporative unit taken along line 7—7 of FIG. 6.

In operation, cool pellets 12 from stage n+1 are fed into the pellet zone 54 of stage 15b through feeder 63. Salt-free water from the trough stage n−1 which is hotter than the salt-free water in stage n and is at a higher pressure, is passed through opening 64a into the trough 59 (see FIG. 5) located in the n stage. Similarly, brine from the brine zone of stage n−1, which is at a higher temperature than the brine in stage n and at a higher pressure, is fed into the brine zone 56 of stage n through opening 66a in wall 62. The hot brine from stage n−1 flashes in stage n converting a portion of the brine to steam which rises from the brine zone 56 through the fresh water zone 55 and into the pellet zone 54. The steam passes between the walls of chamber 53 and the two horizontal walls of the trough 59 in the fresh water zone 55. In a like fashion, salt-free water from stage n−1 flashes in stage n and causes a portion of the salt-free water to evaporate into steam which rises up through the perforated plate 57 into the pellet zone 54. The steam from the two zones 56 and 55 comes in contact with the relatively cool pellets 12 and condenses thereon and transferring heat energy to the pellets. The condensed water vapor drops off the pellets through the perforated plate and into the water trough 59. As can be seen in FIG. 7, the sides of the perforated plate 57 adjacent to the walls of chamber 53 are inclined downward and imperforate so that the salt-free water condensed on the pellets does not flow back down into the brine but rather flows into the perforated region of the plate 57 and falls therethrough.

As stated above, the prevailing pressure in stages n−1, n, and n+1 progressively decreases. Accordingly, both brine and fresh water flows from the higher pressure stages to the lower pressure stages as shown by the arrows. The prevailing pressure difference between stages will be sufficient to insure flow of both brine and salt-free water. In situations where this is not the case, conventional pumps (not shown) will be required to insure flow of brine and salt-free water from stage to stage. Insofar as flow of brine and water are concerned, an inclined vessel such as that shown, has the obvious advantage of reducing the volume of the vessel itself.

At the lowest temperature, lowest pressure stage, the salt-free water is withdrawn, such as through line 28, and stored in storage tanks and the like. The brine is transferred, such as through a line 21, and discharged as waste, or a portion thereof may be recycled back in the feed brine to control the composition thereof as described above. The pellets 12 from the heat exchanger vessel 8 are transferred, such as through a transferring means 46, into this stage through a pellet feeder such as pellet feeder 35. At the stage of highest temperature, highest pressure the pellets are withdrawn through a pellet feeder such as pellet feeder 36, and transferred by pellet transfer means, such as 40 into a pellet heater, such as heater 38. Hot brine from the heat exchanger vessel 8 is transferred into the stage, such as through line 14, into a brine zone. In this embodiment of the invention, an isenthalpic valve is not necessary. Salt-free water is first formed in this stage and accordingly, no salt-free water is fed into this stage.

Although the drawings do not show that the various components of the various apparatuses are insulated, it is to be understood that for the greatest efficiency in the process and equipment, all the units are insulated to minimize heat loss.

Figure 8:
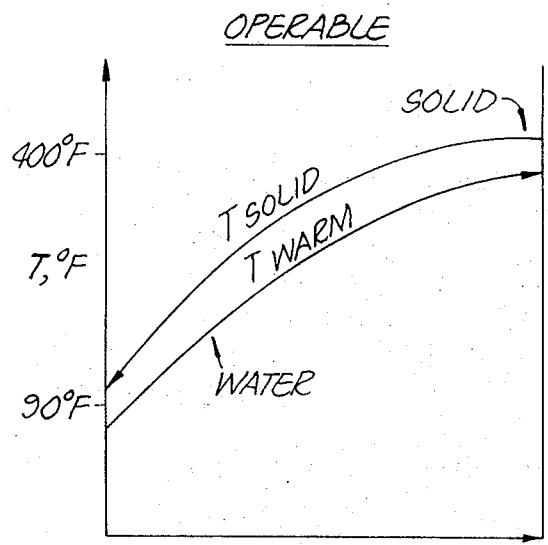
FIG. 8 is a graph of enthalpy vs. temperature for water and an operable pellet solid used in the practice of this invention.
Figure 9:
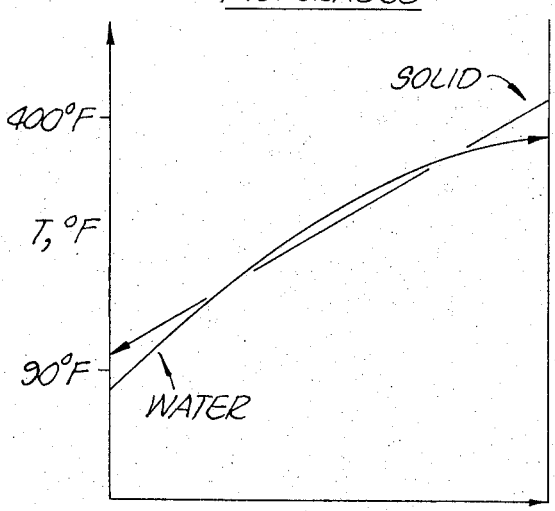
FIG. 9 is a graph similar to FIG. 8 of enthalpy vs. temperature for water and an inoperable pellet solid.

FIGS. 8 and 9 illustrate two idealized enthalpy vs. temperature curves for the water and a pellet solid. $T_{water}$ represents the temperature of the water and $T_{solid}$ represents the temperature of the solids. In order for the present invention to be operable, the temperature of the water must be below the temperature of the solid; preferably, the temperature difference between the water and the solids at each end of the vessel 8 is less than 10°; in an especially preferred embodiment of the present invention, the temperature differential of the solids and water at each end of the vessel 8 will be 1 or 2° F.

Enthalpy is equivalent to the mass times the heat capacity times the temperature change of the substance. In the present invention, the mass of the solid pellets and the mass of the water in vessel 8 will remain substantially constant and the change in temperature will remain substantially constant between the top of the vessel and the bottom of the vessel. Naturally, the heat capacity of the water and the pellet solid will also remain constant, except for change with temperature, although there might be a slight change in heat capacity of the brine if the brine composition fluctuates. Water has one of the highest heat capacities of any known substance; the solid pellets will have a lower heat capacity. Accordingly, to make the present invention operable, a greater mass of solid pellets will have to be utilized per unit mass of brine to heat the brine to the desired temperature. As stated above, in order to obtain maximum efficiency from the present invention, it is desirable that the temperature difference between the pellet solids and the water at each end of the heat exchanger vessel 8 be as small as practical. In order to obtain this desired embodiment, the temperature of the solids over the given process temperature range in the exchanger vessel 8 must not coincide with or fall below the temperature for the water over a given process temperature range. If the temperature of the pellet falls below the temperature of the water as shown in FIG. 9, the exchanger is inoperable and the efficiency of the system suffers greatly. At those points where the temperature value of the solid pellets coincides with or crosses the temperature for the water, there will be no heat transfer from the solid pellets to the water and the efficiency of the process will diminish greatly. The enthalpy curve for iron shows the desired behavior and iron pellets can be used in the present invention; whereas the enthalpy curve for lead crosses the enthalpy curve for water at certain temperatures and lead pellets should not be used in the present invention. Enthalpy curves for most solids are well known and are available or can be readily prepared from known thermodynamical data such as that available from the Bureau of Mines.

When employing flash evaporative stages such as illustrated in FIG. 4 either with water vapor from condensation chamber 20 or water vapor from condensation chamber 20a each of the stages are arranged preferably vertically in line so that the pellets will flow through the stages under the gravity flow. Pumps added to line 19 and 30 as needed to pump the brine and salt-free water from stage to stage. Stages are arranged so that preferably the high temperature, high pressure stage with respect to the brine and salt-free water is the bottom stage and the low temperature, low pressure stage is the top stage. The heat exchanger vessel can also be located above the stages or below the stages if room permits. Many conveyer means can be utilized to move the pellets from the brine heater to the low temperature, low pressure flash evaporative stage and/or the hot pellets to the pellet heater. A conveyer belt using buckets or an Archimedes screw can be used. Both these means are shown in the Heinz Pat. No. 3,442,769 issued May 6, 1969 on Method and Apparatus for Heating and Distilling Saline Water Using Heated Pebbles (see FIGS. 1, 3, 4, and 7). See also FIG. 1 of the Kogan Pat. No. 3,242,975, issued Mar. 29, 1966 on Process and Apparatus for Effecting Heat Transfer.

Our invention is not to be limited to any specific embodiment presented herein as persons skilled in the art will readily see that the broad concept disclosed herein of utilizing pellets to effectuate both the brine heating and vapor condensation can be incorporated into a variety of systems. For example, this invention can be practiced wherein the flow of the pellets countercurrently through the water and/or vapor can be upwardly, downwardly or even horizontally directed depending upon the designers choice and system employed.

The process is illustrated by considering a plant which produces 100,000 gallons per day of salt-free water in accordance with the teachings of this invention. In this example, 124,000 pounds per hour of fresh brine enter the process at 86.4° F. The brine is compressed to an absolute pressure of 247.3 pounds per square inch and then enters the main heat exchanger at essentially 86.4° F. and 247.3 p.s.i.a. (The theoretical work of compression is $0.99 \times 10^5$ B.t.u./hr.).

The brine is then heated in the main heat exchanger by countercurrent contact with descending solids to a temperature of 400° F. The solids (for this example, taken to be ³⁄₃₂ inch diameter iron spheres) enter the main exchanger at 402° F. and at a mass flow rate of $1.06 \times 10^6$ pounds per hour. The solids then leave the main exchanger at 88.4° F. The duty for the main exchanger is $39.6 \times 10^6$ B.t.u./hr. The temperature difference at both the hot and cold ends of the main exchanger is 2° F. However, owing to the effect of temperature on heat capacities of water and iron, most of the heat will be transferred over large temperature differences.

The hot brine next enters the first or highest temperature of the flash chambers. The pressure of the first flash chamber is set at 225.6 p.s.i.a. Part of the brine stream vaporizes upon entering the first chamber until the qualibrium temperature of 392.0° F. is achieved. The salt-free vapor (flow rate of 1,290 pounds per hour) is then separated from the brine and condensed at 392° F. by contact with relatively cool iron spheres. The iron spheres (as indicated earlier, flow rate of $1.06 \times 10^6$ pounds per hour) enter the first chamber at 382.2° F. and are heated to 390° F. by the condensing vapors. The average temperature difference for heat transfer in the first chamber is thus about 46° F. The heat transferred in the first chamber is $10.7 \times 10^5$ B.t.u./hr.

Pressure in the second flash chamber is set at 201 p.s.i.a. Brine leaving the first chamber (122,710 pounds per hour) is again partially vaporized until the equilibrium temperature of 384.2° F. is reached. In this case, 1,230 pounds per hour of salt-free vapor are produced. In addition, condensed salt-free water from the first chamber is partially vaporized upon entering the second chamber. The vapor produced this way is 13 pounds per hour. Thus, a total of 1,243 pounds per hour of salt-free vapor are condensed in the second chamber. The condensing vapors heat the solids from 374.5° F. to 382.2° F., and the total quantity of heat exchanged in the second chamber is $10.4 \times 10^5$ B.t.u./hr.

In like manner, the behavior of subsequent stages could be described. In this example, the plant has 52 flash chambers. The pressure of the 52nd chamber is 0.956 p.s.i.a., and both salt-free water product (34,700 pounds per hour) and waste brine (89,300 pounds per hour) leave the 52nd chamber at 100.3° F. Iron spheres enter the last chamber at 88.4° F.

Because of the effect of temperature on both the heat of vaporization of water and the heat capacity of iron, the vapor flow rate and heat transferred in each stage not a constant, but vary from stage to stage. In this example, the quantity of heat transferred per stage reaches a minimum in stage 31 (about $5.9 \times 10^5$ B.t.u./hr.) and then increases again to about $9.3 \times 10^5$ B.t.u./hr.) in stage 52. The total heat transferred in the series of flash chambers is $38.0 \times 10^6$ B.t.u./hr.

The solids leave the first flash chamber at 390° F. and are then heated to 402° F. by countercurrent exchange with hot gases from a fired heater. The amount of heat transferred to the solids at this point is $16.5 \times 10^5$ B.t.u./hr. which is also the minimum heat requirement for the process.

After reaching 402° F. the solids enter the main heat exchanger and subsequently emerge at 88.4° F. The solids are then washed and fed to the 52nd flash chamber at 88.4° F.

The minimum heat required for the process is also equal to the difference between the heat removed from the solids in the main exchanger ($39.6 \times 10^6$ B.t.u./hr.) and the heat added to the solids in the flash chambers ($38.0 \times 10^6$ B.t.u./hr.). In addition, the heat required for the process may be obtained from an overall energy balance which takes into account the enthalpies of all entering and exit streams, and the external work done on the process. In this example, $\Delta H = 1.72 \times 10^6$ B.t.u./hr. and $W \cong 0.1 \times 10^6$ B.t.u./hr. which results in a minimum heat requirement of about $1.6 \times 10^6$ B.t.u./hr.

The above detailed description has been used only to illustrate the essential features inherent in present invention. It is understood that the present invention is not restricted to the specific features mentioned as other combinations and features utilizing the concepts of this invention will be obvious to those skilled in the art.

What is claimed is:

1. A process for recovering potable water from saline solutions such as seawater and other brackish waters in a pressurized flash distillation system comprising:
    (a) pressurizing the saline water to a pressure that will insure that the saline water will remain liquid during heating of the saline water;
    (b) heating a stream of the pressurized relatively cool saline water to at least the flash distillation temperature of the initial flash distillation stage by countercurrently flowing heated a moving stream of pellets through the stream of saline water, the saline water being pressurized throughout the zone of contact with the pellets and remaining liquid;
    (c) separating the exiting, thus relatively cooled pellets from the stream of heated saline water;
    (d) transferring said stream of heated saline water free of pellets to the initial flash distillation stage, said stream having been heated to the flash distillation temperature in step (b);
    (e) partially reducing the pressure and temperature of said stream of heated saline water in the flash distillation stage to flash distill water vapor from said stream;
    (f) condensing the water vapor produced by the distillation on the surfaces of the separated relatively cooled pellets;
    (g) removing and collecting the condensate from the surfaces of the pellets; and
    (h) reheating the pellets from a source external to said system for recycling through the system as the heated pellets of step (b).

2. The process of Claim 1 wherein said saline water is heated to a temperature ranging from between about 240° F. to about 650° F.

3. The process of Claim 1 wherein said saline water is heated to a temperature of about 400° F. to 450° F.

4. The process of Claim 1 wherein said saline water is heated to a temperature ranging from about 200° F. to the critical temperature of the saline water.

5. The process of Claim 4 wherein said flash distillation of water vapor from said heated water and said condensing of the water produced by distillation on the surface of the separated pellets and the removing and collecting of the condensate from the surface of the pellet is carried out a plurality of times.

6. A process for recovering potable water from saline solutions such as seawater and other brackish waters in a pressurized multi-stage flash distillation system comprising:
    (a) pressurizing saline water to a pressure that will insure that the saline water will remain liquid during the heating of the water;
    (b) heating a flowing stream of the pressurized relatively cool saline water to at least the flash distillation temperature of the initial flash distillation stage by countercurrently flowing a moving stream of heated pellets through the flowing stream of saline water, the saline water being pressurized throughout the zone of contact with said pellets;
    (c) separating the exiting, thus relatively cooled pellets from the stream of heated saline water;
    (d) transferring said stream of heated saline water free of pellets to the initial flash distillation stage of a flash distillation zone, said stream having been heated to the flash distillation temperature in step (b);
    (e) flash distilling water vapor from the heated stream of saline water in a series of independent flash distillation stages in the flash distillation zone along a descending thermal gradient by partially reducing the pressure and temperature of said stream in each of said stages, while sequentially contacting the water vapor from each of the flash distillation stages with said moving stream of separated relatively cooled pellets, along an ascending thermal gradient to condense the water vapor on the pellets in a condensation zone, said pellets being thus warmed to progressively higher temperatures;
    (f) removing and collecting the condensate from the pellets, and
    (g) reheating the pellets from a source external to said system to a temperature above said initial flush distillation temperature for recycling through the system as the heated pellets of step (b).

7. The process of Claim 6 wherein the saline water is heated to a temperature of 400° to 450° F.

8. The process of Claim 6 wherein said saline water is heated to a temperature ranging from 200° F. to 650° F.

9. The process of Claim 8 wherein said pellets are maintained in a dynamically agitated state while they are countercurrently flowing through the stream of saline water.

10. The process of Claim 8 wherein the saline water adhering to the cooled pellets is blown off with an air knife to avoid contamination of the subsequent condensate and to further cool the pellets.

11. The process of Claim 8 wherein said pellets are made of a metal selected from the group comprising iron, aluminum, stainless steel and mixtures thereof.

12. The process of Claim 11 wherein said pellets are made of iron.

13. A process for recovering potable water from saline solutions such as seawater and other brackish waters in a pressurized, multistage flash distillation system comprising:
    (a) pressurizing the saline water to a pressure that will insure that the saline water will remain liquid during the heating of the water;
    (b) heating a flowing stream of the pressurized relatively cool saline water to a temperature of about 400° F. by counter-currently flowing a moving stream of heated pellets through the upwardly flowing stream of saline water while swirling the upwardly flowing stream of water to maintain the downwardly counter-currently flowing pellets in a stage of dynamic agitation, the saline water being pressurized throughout the zone of contact with the pellets;

(c) separating the exiting, thus relatively cool pellets from the stream of heated saline water;

(d) transferring said stream of heated saline water free of pellets to the initial flash distillation stage of a flash distillation zone;

(e) partially reducing the pressure and temperature of the heated saline water heated in step (b) to flash distill water vapor therefrom in a series of independent flash distillation stages in the flash distillation zone along a descending thermal gradient, while, sequentially contacting the water vapor from each of the flash distillation stages with said moving stream of relatively cool pellets along an ascending thermal gradient to condense the water vapor on the pellets and thus warm the pellets to progressively higher temperatures;

(f) separating the condensate from the pellets;

(g) transferring at least a portion of the condensate from each stage to the next stage along the descending thermal gradient and flash distilling water vapor from said condensate while simultaneously flash distilling water vapor from the heated saline water;

(h) collecting the remaining portion of condensate separated from the pellets; and (i) reheating the pellets from a source external of the system for recycling through the system as the heated pellets of step (b).

14. The process of Claim 13 wherein said pellets are made of iron.

References Cited

UNITED STATES PATENTS

| | | | |
|---|---|---|---|
| 2,580,635 | 1/1952 | Winter, Jr. | 165—107 X |
| 2,702,091 | 1/1955 | Smith, Jr. | 165—107 X |
| 2,796,237 | 6/1957 | Nettel | 165—107 X |
| 3,266,556 | 8/1966 | Malek | 159—16 R |
| 3,442,769 | 5/1969 | Heinz | 203—7 |
| 3,242,975 | 3/1966 | Kogan | 165—2 |
| 2,631,835 | 3/1953 | Jones | 165—107 X |

JACK SOFER, Primary Examiner

U.S. Cl. X.R.

159—2 MS, 18, PB; 202—173, 177, 185 A, 186; 203—88, 94, 98, 100